United States Patent
Kouno et al.

(10) Patent No.: US 10,149,444 B2
(45) Date of Patent: Dec. 11, 2018

(54) PLANT DRAW-IN DEVICE AND PLANT BODY TRANSPLANTATION SYSTEM

(71) Applicant: TSUBAKIMOTO CHAIN CO., Osaka-shi, Osaka (JP)

(72) Inventors: Kouji Kouno, Osaka (JP); Tatsuya Hirai, Osaka (JP); Yu Okazaki, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 15/357,265

(22) Filed: Nov. 21, 2016

(65) Prior Publication Data
US 2017/0064916 A1    Mar. 9, 2017

Related U.S. Application Data

(63) Continuation of application No. PCT/JP2015/058028, filed on Mar. 18, 2015.

(30) Foreign Application Priority Data

May 27, 2014  (JP) .................. 2014-108938

(51) Int. Cl.
  *A01G 31/02* (2006.01)
  *A01G 24/00* (2018.01)
  *A01G 9/08* (2006.01)
(52) U.S. Cl.
  CPC ............. *A01G 31/02* (2013.01); *A01G 9/083* (2013.01); *A01G 24/00* (2018.02); *Y02P 60/216* (2015.11)
(58) Field of Classification Search
  CPC ........ A01G 31/02; A01G 31/001; B25B 9/00; B25B 13/481
  (Continued)

(56) References Cited

U.S. PATENT DOCUMENTS 2,212,013 A * 8/1940 Devareaux ............ A47J 43/283
                                                            294/100
2,236,761 A * 4/1941 Nichols ................... E21B 31/12
                                                            175/237
(Continued)

FOREIGN PATENT DOCUMENTS

JP        7-147857 A      6/1995
JP     2000-93027 A      4/2000
(Continued)

OTHER PUBLICATIONS

International Search Report dated Jun. 9, 2015, issued in counterpart International Application No. PCT/JP2015/058028 (1 page).

*Primary Examiner* — Magdalena Topolski
(74) *Attorney, Agent, or Firm* — Western, Hattori, Daniels & Adrian, LLP

(57) ABSTRACT

A plant draw-in device and a plant body transplantation system that can draw roots of plant bodies into holes reliably with a simple structure, so that there is no need of monitoring or manual operation for roots insertion and the production efficiency can be improved. The plant draw-in device 110 includes a draw-in tube 111 that can be disposed below a hole 121, a draw-in member 113 provided such as to be capable of protruding from the draw-in tube 111, and a drive unit 114 that reciprocally moves the draw-in member 113 such as to come out from, and retract into, the draw-in tube 111. The draw-in member 113 is formed such that a portion thereof protruding from the draw-in tube 111 deforms and spreads outward.

4 Claims, 5 Drawing Sheets

(58) Field of Classification Search
USPC .......... 47/1.01 P, 1.01 R; 294/100; 81/53.11, 81/53.12
See application file for complete search history.

(56) References Cited

U.S. PATENT DOCUMENTS

| | | | | |
|---|---|---|---|---|
| 2,681,822 | A * | 6/1954 | Daniels | H01K 3/32 294/99.1 |
| 2,690,927 | A * | 10/1954 | Bean | A01K 97/00 177/245 |
| 3,056,318 | A * | 10/1962 | Anderson | B25B 9/00 81/112 |
| 4,130,314 | A * | 12/1978 | Storm | A21C 9/08 294/100 |
| 4,828,309 | A * | 5/1989 | Germaine | B65G 47/90 294/100 |
| 4,893,571 | A * | 1/1990 | Hakli | A01C 11/025 111/105 |
| 5,121,955 | A * | 6/1992 | Visser | A01G 9/086 111/104 |
| 5,213,015 | A * | 5/1993 | Disston, Jr. | B25B 9/00 279/52 |
| 5,320,649 | A * | 6/1994 | Holland | A01C 11/025 111/105 |
| 5,536,281 | A * | 7/1996 | Lambert | A01G 9/108 111/104 |
| 5,642,913 | A * | 7/1997 | Brown | A45D 29/007 132/73 |
| 5,924,175 | A * | 7/1999 | Lippitt | A61B 17/221 24/537 |
| 6,106,042 | A * | 8/2000 | McCloy, Jr. | A01M 31/02 294/100 |
| 6,315,340 | B1 * | 11/2001 | Chen | B25B 9/00 294/100 |
| 6,571,505 | B1 * | 6/2003 | Poiencot, Jr. | A01K 97/14 119/806 |
| 6,743,113 | B2 * | 6/2004 | Pettinga | |
| 7,168,375 | B2 * | 1/2007 | Huang | A01C 11/025 111/105 |
| 7,281,740 | B1 * | 10/2007 | Fields | A01B 1/16 294/100 |
| 7,713,136 | B1 * | 5/2010 | Colucci | A63B 47/02 294/19.2 |
| 8,104,806 | B1 * | 1/2012 | Shih | B25J 1/02 294/100 |
| 2004/0041423 | A1 * | 3/2004 | Cannon | B25B 9/00 294/100 |
| 2008/0315605 | A1 * | 12/2008 | Shih | B25J 1/02 294/100 |
| 2015/0201551 | A1 * | 7/2015 | Ohara | A01C 11/02 47/1.01 P |
| 2015/0216116 | A1 | 8/2015 | Hirai et al. | |
| 2015/0230413 | A1 * | 8/2015 | Hirai | A01G 9/12 47/63 |

FOREIGN PATENT DOCUMENTS

| | | |
|---|---|---|
| JP | 2000-166408 A | 6/2000 |
| JP | 2014-73102 A | 4/2014 |

* cited by examiner

PLANT DRAW-IN DEVICE AND PLANT BODY TRANSPLANTATION SYSTEM

TECHNICAL FIELD

The present invention relates to a plant draw-in device that draws roots of plant bodies into holes of a cultivation panel or the like, and a plant body transplantation system. The invention relates to a plant draw-in device and a plant body transplantation system used for example, in hydroponic cultivation equipment in a plant factory or the like for transplantation of plant bodies into holes of different cultivation panels in accordance with their growth.

BACKGROUND ART

Hydroponic cultivation equipment used in a plant factory or the like is conventionally known, wherein plant bodies are held on a holder member such as, for example, a cultivation panel having a plurality of holes, with the roots of the plant bodies extending downward from the holes of the cultivation panel being immersed in cultivation liquid or the like, or sprayed with cultivation liquid or the like.

When cultivating plants that grow in a horizontally widespread manner, for example, by holding them on a holder panel in such hydroponic cultivation equipment, if a single cultivation panel with holes spaced apart in consideration of their grown size is used, the space efficiency will be low, which will reduce the overall production efficiency.

For this reason, plant bodies are transplanted from one to another of cultivation panels with different pitches of holes as the plants grow. For efficient use of space, such transplantation work should desirably be carried out frequently with the plants' growth.

In a plant factory or the like, a reduction in the overall production efficiency due to the plantation work should be avoided. Therefore, a cultivation facility has been proposed where the transplantation work is automated with the use of transplantation devices wherein plant bodies are transplanted from one to another of cultivation panels with different pitches of holes (see, for example, Patent Literature 1).

CITATION LIST

Patent Literature

Patent Literature 1: Japanese Patent Application Laid-open No. H7-147857
Patent Literature 2: Japanese Patent Application Laid-open No. 2000-166408

SUMMARY OF THE INVENTION

Technical Problem

However, plant bodies increase in root length, thickness, and amount as they grow, and these increases vary among individual plant bodies, so that there is a possibility that, when the plant body is transplanted into a hole, part or all of the roots may not go into the hole because of which, sometimes, plant bodies failed to be transplanted into the holes, or even when they were transplanted, some or all of the roots did not come out below the holes.

Cultivation of the plant bodies that failed to be transplanted into the holes cannot be carried on thereafter, and when some or all of the roots are not sticking out below the holes, the cultivation liquid cannot be supplied sufficiently to the roots, because of which the growth of the plant bodies will be hindered and in the worst case the plants may die.

In the known transplantation device such as the one shown in Patent Literature 1, the problems described above associated with the insertion of the roots of plant bodies into holes are not taken into consideration. Therefore, to prevent these troubles, the conditions of transplantation and the status of roots had to be monitored and when an unsatisfactory condition was identified, an operator had to carry out a manual operation, which was an impediment to an improvement of overall production efficiency.

A transplantation device having a suction means such as the one shown in Patent Literature 2 is also known. However, when some or all of the roots of plant bodies fail to be inserted and remain above and around the holes, they cannot be fully sucked in, and the problem arises that the roots are left there and will not grow downward below the holes.

The suction force could be increased. However, it will only increase the amount of sucked-in air and will not sufficiently increase the force of sucking the roots, since roots of plant bodies are sparsely intertwined in a large number. An increased suction force may instead pull the plant body itself (or the cultivation pot that holds the plant body) powerfully into the hole and may damage the plant body.

For this reason, the conditions of the transplantation and the status of the roots had to be monitored after all, and the operator had to carry out a manual operation when an unsatisfactory condition was identified.

Another problem with this device was that it required a drive source such as a pump for the sucking, which makes the device more complex.

The present invention solves these problems and an object of the invention is to provide a plant draw-in device and a plant body transplantation system that can draw roots of plant bodies into holes reliably with a simple structure, so that there is no need of monitoring or manual operation for roots insertion and the production efficiency can be improved.

Solution to Problem

A plant draw-in device according to the present invention resides in a plant draw-in device for drawing roots of plant bodies into holes and includes a draw-in tube that can be disposed below a hole, a draw-in member provided such as to be capable of protruding from the draw-in tube, and a drive unit that reciprocally moves the draw-in member such as to come out from, and retract into, the draw-in tube, the draw-in member being formed such that a portion thereof protruding from the draw-in tube deforms and spreads outward, whereby the problems described above are solved.

A plant body transplantation system according to the present invention resides in a plant body transplantation system including a cultivation panel provided with a plurality of holes that vertically penetrate the cultivation panel and can hold plant bodies, and a plant draw-in device for drawing roots of plant bodies into the holes, the plant draw-in device being the plant draw-in device described above, and the draw-in tube having an inner diameter that is not greater than an inner diameter of each of the holes in the cultivation panel, whereby the problems described above are solved.

Advantageous Effects of Invention

The plant draw-in device according to claim 1 includes a draw-in tube that can be disposed below a hole, a draw-in member provided such as to be capable of protruding from the draw-in tube, and a drive unit that reciprocally moves the draw-in member such as to come out from, and retract into, the draw-in tube, the draw-in member being formed such that a portion thereof protruding from the draw-in tube deforms and spreads outward. Therefore, when the draw-in member protrudes from the draw-in tube, it passes through the hole, and deforms and spreads outward above the hole, so that the roots of a plant body to be transplanted can be received in a wide area.

As the draw-in member is drawn into the draw-in tube, the roots of the plant body gripped by the draw-in member are drawn into the hole to therebelow, so that the transplantation can be completed with hardly any roots of the plant body left above the hole.

Therefore, the drive unit can be a simple one that imparts only reciprocal movement, and also the draw-in member and draw-in tube can be structured simply. Thus, roots of plant bodies can be automatically drawn into holes reliably with a simple structure, so that there is no need of monitoring or manual operation for roots insertion and the production efficiency can be improved.

According to the structure as set forth in claim 2, the draw-in member includes a plurality of ribs disposed along an inner circumference of the draw-in tube to extend along a protruding direction, and the plurality of ribs are imparted with resilience so that each of the ribs spreads radially outward of the draw-in tube. Therefore, the draw-in member can be structured simply, and since the plurality of ribs spread radially when they protrude from the draw-in tube, the roots of the plant body to be transplanted can be received in a wide area more reliably.

According to the structure as set forth in claim 3, a lateral member that allows the ribs to spread outward is further provided between adjacent ribs, and according to the structure as set forth in claim 4, the lateral member is formed in a film shape, so that more roots can be drawn in more reliably.

In the plant body transplantation system according to claim 5, the draw-in tube has an inner diameter that is not greater than an inner diameter of each of the holes in the cultivation panel. Therefore, when the draw-in member sticks out from below the hole in the cultivation panel, the draw-in member passes through the hole smoothly and reliably deforms above the hole to spread outward, so that transplantation can be completed reliably even in an automated operation.

According to the structure as set forth in claim 6, the draw-in tube has a distal end part formed in a shape such that the distal end part can be inserted into each of the holes of the cultivation panel from below, which allows easy positioning of the hole and the draw-in tube, and enables smooth passage of the draw-in member through the hole more reliably.

According to the structure as set forth in claim 7, the holes in the cultivation panel each have an upper end portion with an inner diameter that is larger than an inner diameter of a lower end portion thereof, so that the roots of the plant body gripped by the draw-in member can be drawn into the hole of the cultivation panel more smoothly.

According to the structure as set forth in claim 8, a maximum diameter of the draw-in member when the draw-in member spreads outward above the cultivation panel is not greater than a pitch of the plurality of holes in the cultivation panel. Therefore, when a plurality of plant bodies are waiting above the cultivation panel at the same time, or when a transplantation operation is carried out with the use of a plurality of plant draw-in devices, roots of other plant bodies adjacent the target plant body are prevented from being drawn in, and interference between adjacent draw-in members is prevented, so that plant bodies can be reliably transplanted into target holes as intended.

REFERENCE SIGNS LIST

Figure 1:
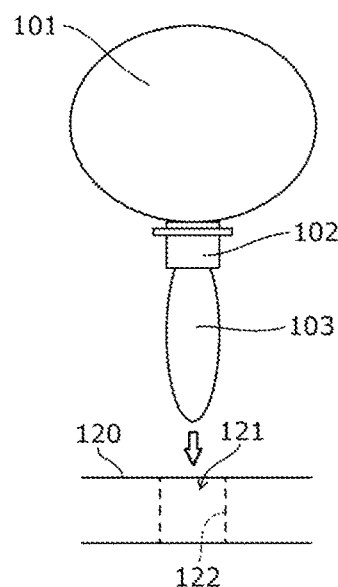
FIG. 1 is a schematic illustrative diagram of a plant body.

101 Plant body
102 Cultivation pot
103 Root
110 Plant draw-in device
111 Draw-in tube
112 Distal end part
113 Draw-in member (ribs)
114 Drive unit
120 Cultivation panel
121 Hole
122 Inner circumferential surface Description of Embodiments The plant draw-in device of the present invention resides in a plant draw-in device for drawing roots of plant bodies into holes and includes a draw-in tube that can be disposed below a hole, a draw-in member provided such as to be capable of protruding from the draw-in tube, and a drive unit that reciprocally moves the draw-in member such as to come out from, and retract into, the draw-in tube, wherein the draw-in member is formed such that a portion thereof protruding from the draw-in tube deforms and spreads outward. The plant body transplantation system according to the present invention resides in a plant body transplantation system including a cultivation panel provided with a plurality of holes that vertically penetrate the cultivation panel and can hold plant bodies, and a plant draw-in device for drawing roots of plant bodies into the holes, wherein the plant draw-in device is the plant draw-in device described above, and the draw-in tube has an inner diameter that is not greater than an inner diameter of each of the holes in the cultivation panel. The device and system may have any specific configuration as long as roots of plant bodies can be drawn into holes reliably with a simple structure, so that there is no need of monitoring or manual operation for roots insertion and the production efficiency can be improved.

All the drawings to be used for the description below are simplified and do not indicate the actual arrangements, shapes, dimensional ratios and the like.

First, schematics of one example of a plant body and a cultivation panel handled in the plant draw-in device and plant body transplantation system of the present invention will be described.

Plant bodies 101 are cultivated each in one cultivation pot 102 as shown in FIG. 1 and their stems and leaves grow into the space above the cultivation pots 102, while their roots (including rhizomes) grow into the space below.

The cultivation pots 102 are inserted and held in holes 121 formed in a cultivation panel 120, so that the plant bodies 101 are handled by the cultivation panel 120 and cultivated in various cultivation equipment in a plant factory or the like.

Figure 2:
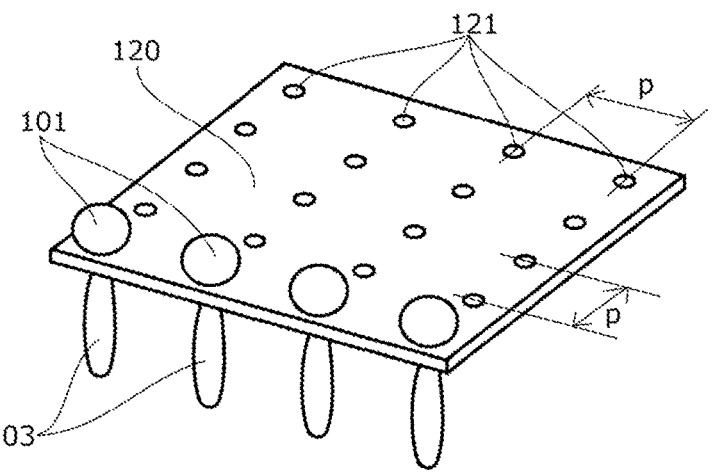
FIG. 2 is a schematic illustrative diagram of a cultivation panel.
Figure 3:
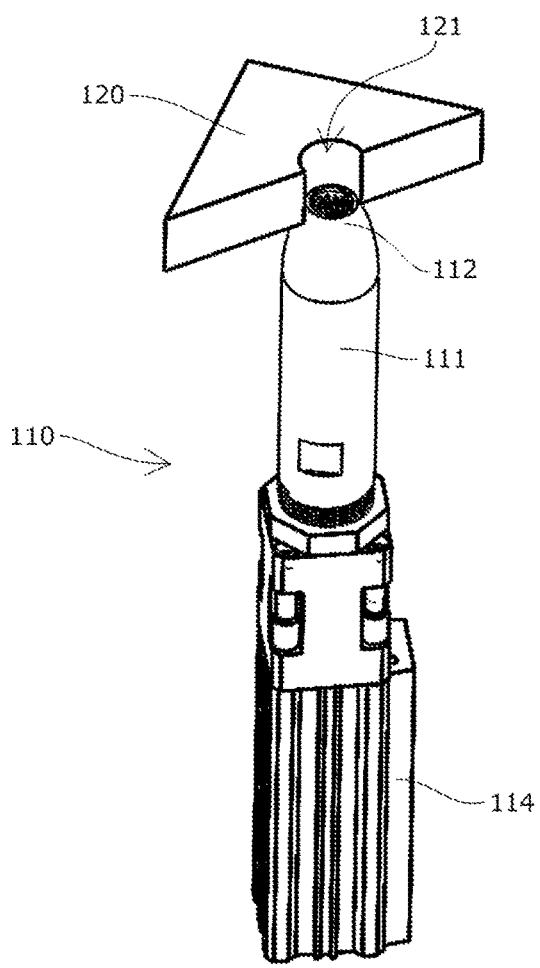
FIG. 3 is a perspective view of a plant draw-in device according to one embodiment of the present invention.
Figure 4:
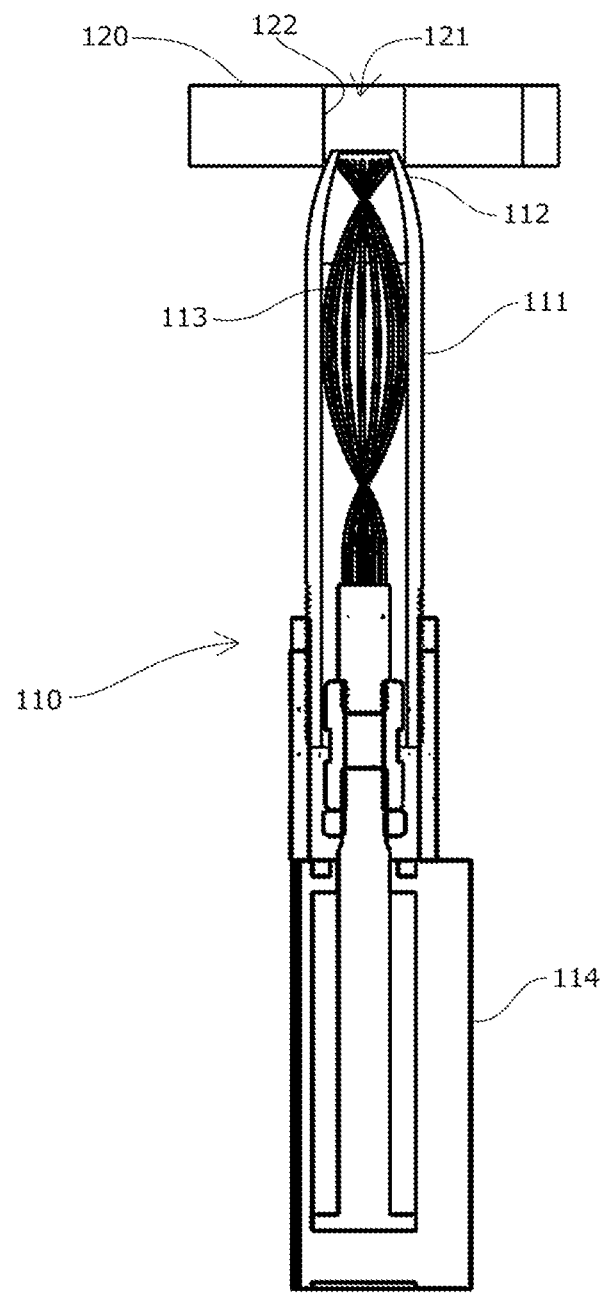
FIG. 4 is a cross section viewed from one side of FIG. 3.
Figure 5:
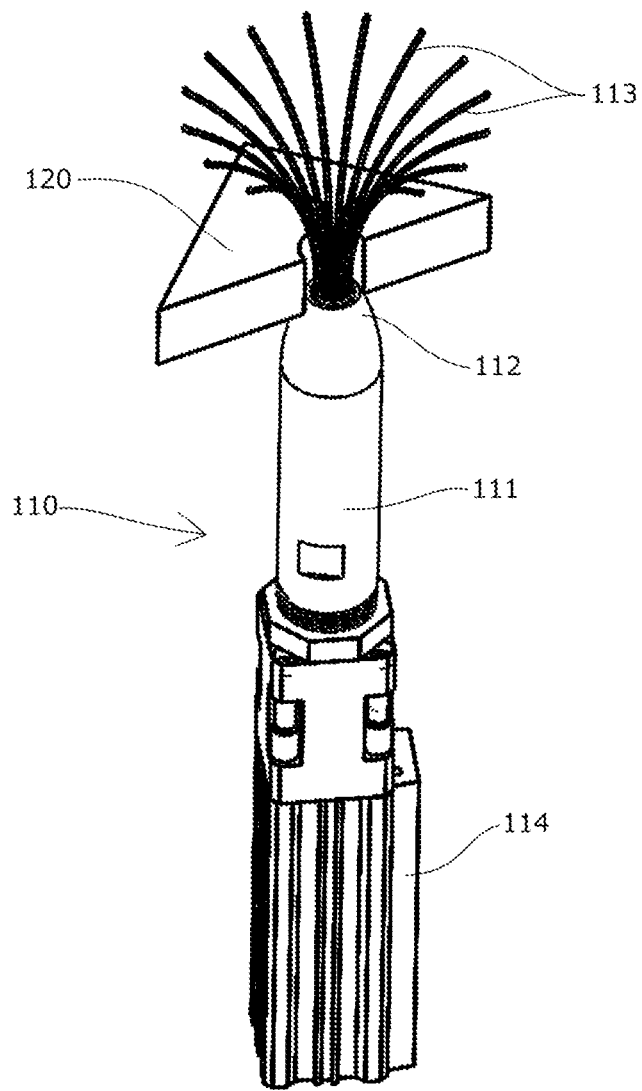
FIG. 5 is a perspective view of the plant draw-in device according to one embodiment of the present invention when the draw-in member is protruded.
Figure 6:
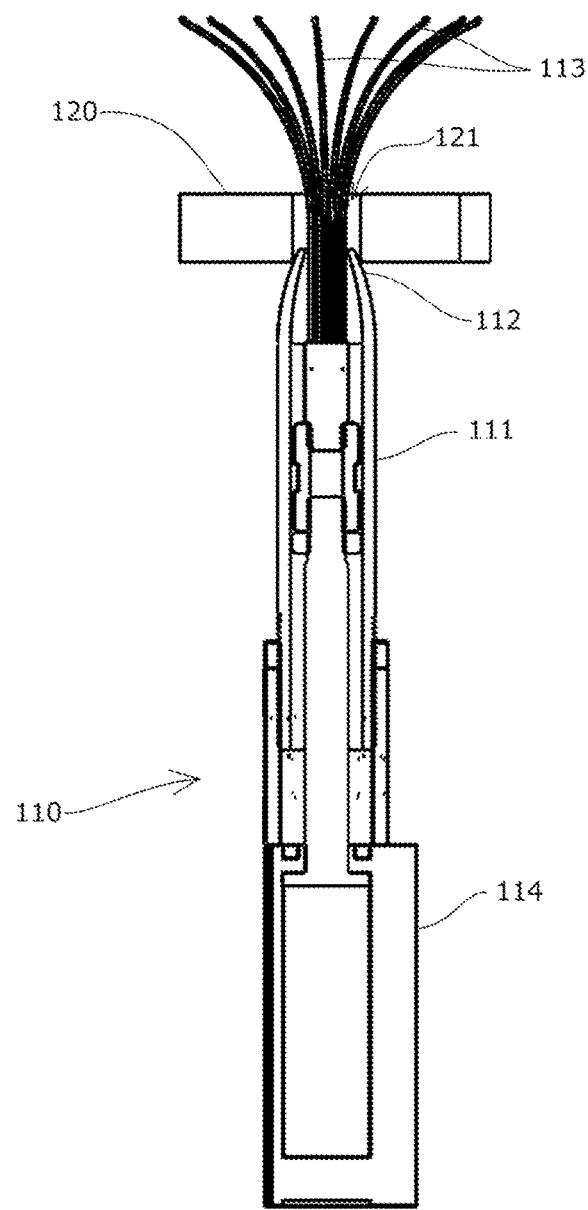
FIG. 6 is a cross section viewed from one side of FIG. 5.

A plurality of holes 121 are formed in the cultivation panel 120 as shown in FIG. 2. Predetermined types of panels varying in the number, spacing, and the like of the holes 121 are prepared in accordance with the spreading of the stems and leaves of the plant bodies 101, and the plant bodies are transplanted from one to another of the cultivation panels 120 with the cultivation pots 102 in accordance with the plants' growth.

Embodiment 1

The plant draw-in device 110 according to a first embodiment of the present invention includes, as shown in FIG. 3 to FIG. 6, a draw-in tube 111 that can be disposed below a hole 121 in the cultivation panel 120, a draw-in member 113 provided such as to be capable of protruding from the draw-in tube 111, and a drive unit 114 that reciprocally moves the draw-in member 113 such as to come out from, and retract into, a distal end part 112 of the draw-in tube 111.

The draw-in member 113 is made up of a plurality of ribs disposed along the inner circumference of the draw-in tube 111 to extend along the protruding direction.

The plurality of ribs that make up the draw-in member 113 are imparted with resilience so that the portions thereof protruding from the distal end part 112 of the draw-in tube 111 deform and spread radially outward.

The draw-in tube 111 has an inner diameter that is not greater than the inner diameter of the holes 121 in the cultivation panel 120, and the distal end part 112 of the draw-in tube 111 is formed in a shape such that the distal end part 112 can be inserted into the hole 121 of the cultivation panel 120 from below.

Although the illustrated drive unit 114 adopts a form of a fluid cylinder, any drive means may be used.

The draw-in member 113 may include a lateral member such as a link member or a flexible film member and the like that allows the plurality of ribs to spread outward and restricts the maximum spreading radius.

The maximum radius of the draw-in member 113 when it spreads outward above the cultivation panel 120 may be set equal to or smaller than the pitch p of the plurality of holes 121 in the cultivation panel 120, so that the roots 103 of the plant body 101 that should be drawn into an adjacent hole 121 are less likely to be drawn in.

While various mechanisms for carrying out a transplantation operation such as a handling mechanism that grips or moves the plant bodies 101 (or cultivation pots 102), a mechanism that moves and positions the cultivation panels 120, a mechanism that brings the draw-in tube 111 of the plant draw-in device 110 into and out of contact with the underside of the cultivation panel 120, and the like, are not shown, these mechanisms may be laid out in any arrangement, and operations of some or all of these mechanisms may be performed manually by an operator.

A plant body transplantation system may be configured to include the various mechanisms mentioned above such that a plurality of plant draw-in devices 110 are arranged corresponding to the pitch p of the cultivation pots 102 so that the roots 103 of a plurality of plant bodies 101 are simultaneously drawn into the holes 121 of the cultivation panel 120.

Although the plurality of holes 121 in the cultivation panel 120 shown in FIG. 1 to FIG. 6 have a cylindrical inner circumferential surface 122, the holes may have any shape.

For example, the holes may have a conical trapezoid shape wherein the upper end portion has a larger diameter than that of the lower end portion, so that the roots 103 of plant bodies 101 gripped by the draw-in member 113 can be drawn into the holes 121 in the cultivation panel 120 even more smoothly.

Optionally, a taper or the like of a shape conforming to the outer diameter of the distal end part 112 of the draw-in tube 111 may be provided only at and around the lower end portion where the distal end part 112 of the draw-in tube 111 is inserted.

According to the embodiment of the present invention configured as described above, roots of plant bodies can be reliably drawn into the holes with a simple structure, so that there is no need of monitoring or manual operation for roots insertion and the production efficiency can be improved. While the embodiment described above is for drawing the plant roots into the holes 121 of the cultivation panel 120, it may be carried out for exchanging the cultivation pot 102 with another empty cultivation pot.

The invention claimed is:

1. A plant body transplantation system comprising a cultivation panel provided with a plurality of holes that vertically penetrate the cultivation panel and can hold plant bodies, and a plant draw-in device for drawing roots of plant bodies into the holes, the plant draw-in device comprising a draw-in tube that can be disposed below a hole of the plurality of holes of the cultivation panel, a plurality of ribs provided to be capable of protruding from the draw-in tube, and a drive unit that reciprocatingly moves the plurality of ribs to come out from, and retract into, the draw-in tube, the plurality of ribs can be retracted along an inner circumference of the draw-in tube to extend along a lengthwise direction of the draw-in tube upon retraction into the draw-in tube, the plurality of ribs being imparted with resilience so that each of the ribs spreads in an uniform arc radially in an outward direction of the draw-in tube upon projection from the draw-in tube, the draw-in tube having an inner diameter that is not greater than an inner diameter of each of the holes in the cultivation panel, and wherein upon said projection from the draw-in tube, entire projecting portions of the plurality of ribs that project from the draw-in tube curve consistently outwardly away from a central axis of the draw-in tube.

2. The plant body transplantation system according to claim 1, wherein a maximum spreading diameter collectively of ends of the plurality of ribs when the plurality of ribs spread outward above the cultivation panel is not greater than a pitch of the plurality of holes in the cultivation panel.

3. The plant body transplantation system according to claim 1, wherein said plurality of ribs have a substantially consistent width to ends of the plurality of ribs.

4. The plant body transplantation system according to claim 1, wherein due to the plurality of ribs being imparted with said resilience each of the ribs spreads in said uniform arc radially in said outward direction of the draw-in tube upon projection from the draw-in tube even without any external force applied to each of said ribs.

* * * * *